June 10, 1969
P. L. STONE
3,449,670
ADJUSTABLE MEANS FOR A SELF-BALANCING
POTENTIOMETER INDICATING DEVICE
Filed Aug. 2, 1966
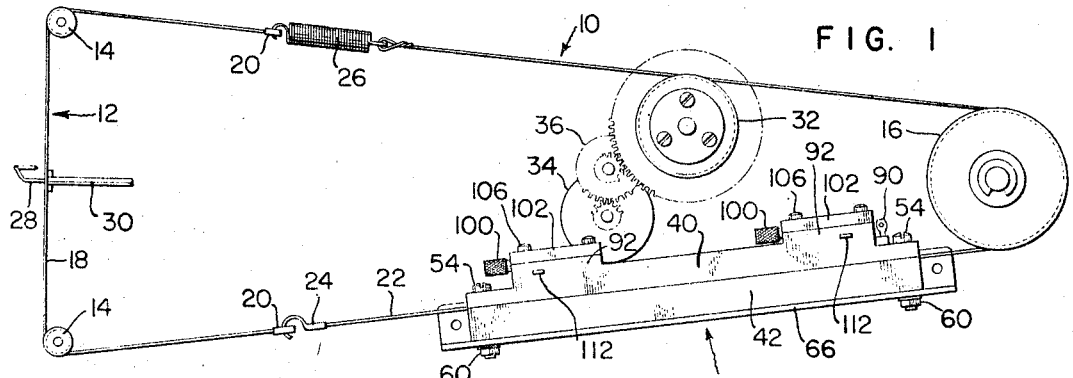
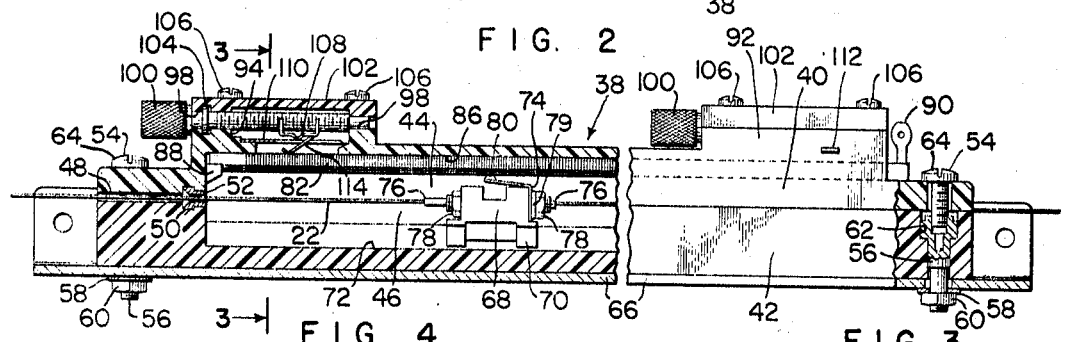
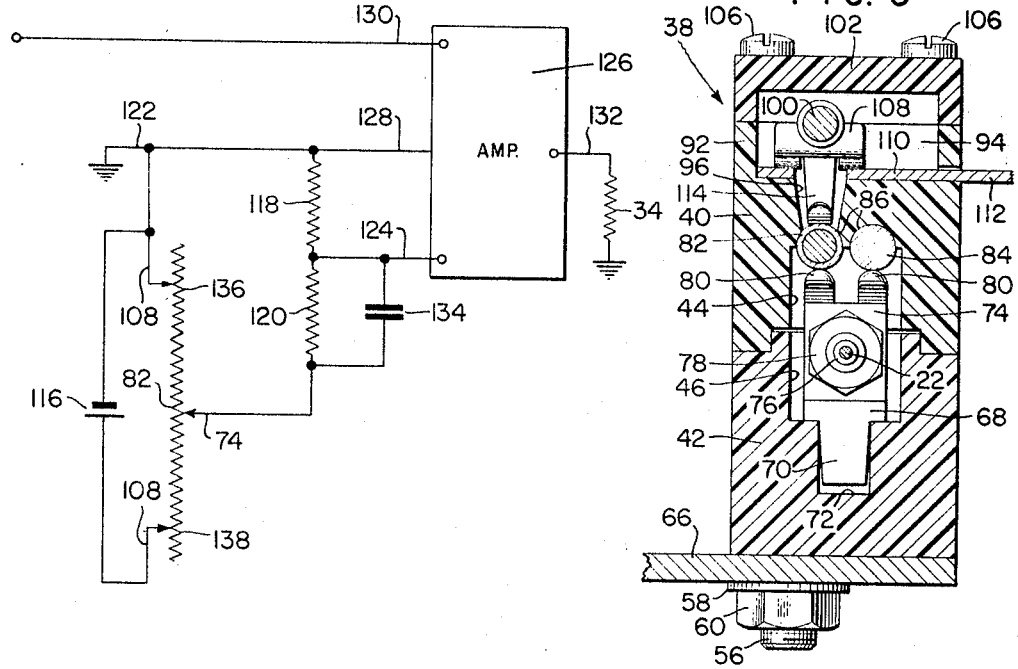
INVENTOR.
PAUL L. STONE
BY *M. Michael Carpenter*
ATTORNEY.

June 10, 1969

P. L. STONE 3,449,670

ADJUSTABLE MEANS FOR A SELF-BALANCING
POTENTIOMETER INDICATING DEVICE

Filed Aug. 2, 1966

INVENTOR.
PAUL L. STONE

BY *M. Michael Carpenter*

ATTORNEY.

United States Patent Office 3,449,670
Patented June 10, 1969

3,449,670
ADJUSTABLE MEANS FOR A SELF-BALANCING
POTENTIOMETER INDICATING DEVICE
Paul L. Stone, Meadowbrook, Pa., assignor to
Honeywell Inc., Minneapolis, Minn., a corporation of Delaware
Filed Aug. 2, 1966, Ser. No. 569,716
Int. Cl. G01r 17/06
U.S. Cl. 324—99          10 Claims

ABSTRACT OF THE DISCLOSURE

An indicating device of the self-balancing potentiometer type is shown having a potentiometer for generating a potential signal which is applied to a differential amplifier along with an input signal to be indicated. The resultant output signal energizes a motor for driving an indicator and the potentiometer to a new balanced position. Adjustable contacts engage each end of the potentiometer slide-wire for providing a zero and span adjustment of the indicating device.

---

The present invention relates to an adjustment means for an indicating device wherein an input signal causes a displacement of the indicator for producing a change within an impedance element thereby creating a potential utilized to rebalance the indicator. More particularly, the instant invention pertains to the means for producing the impedance change within the indicating device and the means for adjusting the impedance element which causes that change.

Prior art indicators, such as pen recorders, strip charts, and continuous web indicators, utilize an impedance element, associated with the moving indicator, for providing a reference signal. The reference signal is compared with an input signal for producing a driving signal that displaces the indicator in the proper direction, thereby adjusting the impedance element and reestablishing a balanced condition within the indicator. Examples of a pen recorder and strip chart recorder incorporating such an arrangement may be found in Patent No. 2,398,341, issued to W. P. Wills on Apr. 9, 1946 and Patent No. 2,423,480, issued to J. A. Caldwell on July 8, 1947, each assigned to the Brown Instrument Company, now Honeywell Inc. An example of a continuous web indicator having the arrangement described above may be found in Patent No. 2,968,805, issued to D. J. Sikorra, Jan. 17, 1961, which is also assigned to Honeywell Inc. These indicating devices either do not provide for the adjustment of the impedance element, utilized within the indicator, or the adjustment thereof is achieved through the use of a separate impedance device.

It is, therefore, an object of the present invention to provide an adjustment means for an impedance element used within an indicating device which is a compact part of that impedance element and is capable of simplifying the adjustment thereof.

Another object of the instant invention is to provide an indicating device with impedance adjustment means which are compactly arranged for establishing the necessary adjustments within a unitary housing.

Still another object of this invention is to provide an adjustment means within an indicating device which is capable of adjusting the zero setting and full scale reading of the indicator through the utilization of a unique electro-mechanical arrangement incorporated into a unitary compact housing also containing the impedance element of the indicating device.

A further object of the present invention is to provide a plurality of adjustments for a single impedance element utilized within a voltage dividing network to establish the necessary adjustments for an indicating device.

A still further object of the instant invention is to provide an indicating device of the continuous web type with a housing, containing an impedance element, through which a continuous web passes for establishing the adjustments of the impedance element and thereby the indicator.

Another further object of the present invention is to provide adjustment means for a plurality of impedance elements utilized within a multiple signal indicating device wherein the multiple adjustments are contained within a unitary housing having a uniquely simplified circuitry.

Other objects and many advantages of the present invention will be readily appreciated as the same becomes better understood when considered in connection with the accompanying specification and drawings, wherein:

FIG. 1 is a side elevation, showing a pen recorder of the continuous web type incorporating the present invention;

FIG. 2 is a side elevation, partly in section, showing the housing and impedance element of the present invention;

FIG. 3 is a sectional view taken along line 3—3 of FIG. 2;

FIG. 4 is a schematic representation illustrating the circuitry utilized in combination with FIGS. 2 and 3;

Figure 5:
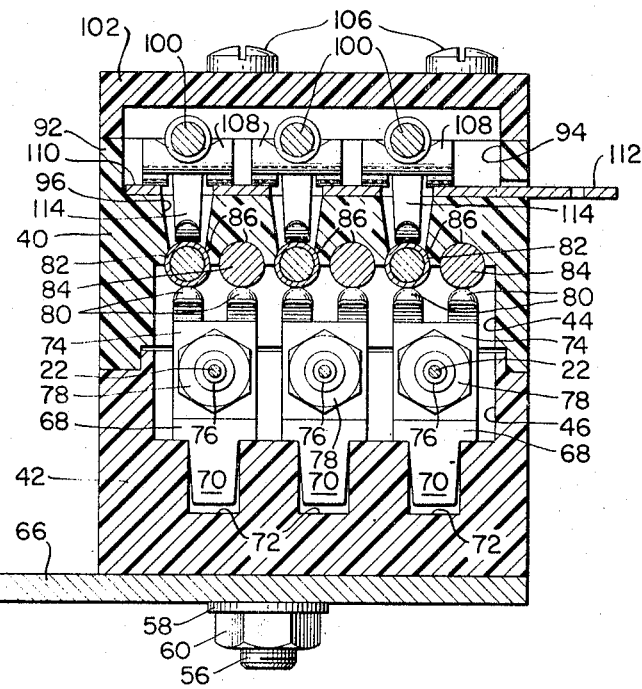
FIG. 5 is a sectional view, similar to FIG. 3, showing a variation of the embodiment illustrated therein.

The indicating device of the present invention utilizes a continuous web including a cable and tape portion connected by a spring for providing the desired indication. In the preferred embodiment, a pen is attached to the tape portion of the continuous web for providing a permanent record of the monitored input signal, as the pen is displaced vertically upon a transversely driven chart. The tape portion of the continuous web passes around a pair of rollers and attaches at one end to the cable portion which passes over a turn-around roller and connects to the other end of the tape portion through a spring. The cable portion threads through a housing and attaches to a slidably mounted block therein. The block includes a wiper spring contact which is attached thereto and arranged to wipe against an impedance element mounted within the housing. Each end of the impedance element is contacted by an adjustable spring contact whose position thereon is adjusted through the rotation of a threaded mounting shaft associated therewith. Adjustment of each adjustable spring contact, through shaft rotation, causes an electrical change within the impedance element for adjusting the zero setting and full scale reading of the pen recorder.

Referring to the drawings in more detail, FIG. 1 shows a pen recorder 10 having a continuous web member 12 passing over a pair of rollers 14 and a turn-around roller 16. The continuous web 12 comprises a tape portion 18 having a pair of eyelets 20 attached within each end thereof. A cable 22, having a hook member 24 attached to one end thereof, connects to an eyelet 20 and passes around the turn-around roller 16 before connecting to the second eyelet 20 in the opposite end of the tape portion 18, through an extension spring 26. The rollers 14 support the tape portion 18 in a straight line therebetween for providing an area to which a pen 28 is attached. A capillary tube 30 is connected to the pen 28 for supplying ink thereto, from a supply not shown. A chart drive, not shown, conveys a recording paper between the rollers 14 and transversely passed the pen 28. Motion is introduced to the continuous web 12 through a grooved drum 32 around which the cable portion 22 is wrapped. The drum 32 is driven by a balancing motor 34 attached thereto through a gear train 36.

The cable portion 22, of the continuous web 12, passes through a housing 38 having a rectangular cross section, as best seen in FIGS. 2 and 3. The housing 38 is divided along its longitudinal axis into an upper portion 40 and a lower portion 42 molded from a suitable insulating material, such as phenolic. Housings 40 and 42 are relieved along their mating surfaces for forming longitudinally extending, rectangular cross sectioned, inner chambers 44 and 46 respectively therein. The mating surfaces of the upper and lower housing portions are further relieved, in the form of grooves 48, for providing a passageway through which the cable 22 is threaded. The grooves 48 are radially enlarged for forming semicyclindrical T-shaped openings 50 which communicate with the inner chambers 44 and 46. The T-shaped chambers thus formed receive a pair of cable supporting inserts 52 constructed from a low friction bearing material, such as polytetrafluroethylene. The inserts 52 are retained within their respective chambers by the closure of the upper and lower housing portions, thereby forming cylindrical chambers. The housings 40 and 42 are retained in facing closed relationship by a plurality of clamping assemblies 54. Each clamping assembly 54 consists of a metal insert 56 having a reduced lower threaded portion for receiving a lock washer 58 and nut 60. The upper portion of the metal insert 56 is radially enlarged for forming a collar which is retained within a counter board portion of an aperture 62 extending through the lower housing 42. A screw 64, passing through a clearance aperture within the upper housing 40, is secured within the internally threaded upper portion of the metal insert 56 for completing the clamping assembly 54. A mounting bracket 66 is provided to support the housing 38 and is connected thereto by the clamping assembly 54.

The presence of the spring 26 within the continuous web arrangement creates a tension within the cable 22. The cable supporting inserts 52 retain the cable 22 in a taut position, as it passes through the inner chamber 44–46, formed by the closure of housings 40 and 42. The taut cable 22 also passes through a rectangular block 68, having a reduced tapered lower portion 70, which is slidably mounted within chamber 44–46. A channel 72 extends longitudinally along the bottom surface of the inner chamber 46 for slidably receiving the reduced tapered portion 70 of the slidable block 68. A wiper spring contact 74 is secured against the block 68 by a tubular rod 76, passing through a suitable opening within the block and also through the wiper spring contact, before it is attached thereto by nuts 78. The wiper spring contact 74 is electrically insulated from the nut 78 and rod 76 by a fiber washer 79, while the block 68 is molded from a suitable insulating material, such as phenolic. One end of the tubular rod 76 extends a sufficient distance beyond the slidable block 68 where it is attached to the cable 22, passing therethrough, as by crimping the tubular rod 76 against the cable 22.

The wiper spring contact 74 is bifurcated for forming a pair of arms each having a wiper tip 80 thereon for contacting an impedance element 82 and a collector element 84. Each element is retained within a semicircular grooved portion 86 located within the top surface of the inner chamber 44. The impedance element consists of an insulating rod about which is wrapped a suitable conducting wire, as for example a phenolic rod having a No. 40 copper wire wrapped thereon, for forming a resistive slide-wire. The collector element is constructed from a rod of conductive material, such as cooper. The impedance element 82 terminates against each end of the inner chamber 44 where it is secured by a clamping cross bar 88, held in position as by bonding. The collector element 84 terminates at one end of the inner chamber 44 with its opposite end extending through the upper housing portion 40 for providing an exposed position to which is mounted an electrical terminal 90. The collector element 84 is also secured by the clamping bar 88.

The upper housing 40 is formed with a raised housing section 92 at each of its longitudinal ends. Each housing section is internally relieved for forming a subchamber 94 which communicates, through a passageway 96, with the inner chamber 44 above the impedance element 82. The upper exterior edges of the housing sections 92 are semicircularly relieved for forming grooves 98 which receive a pair of threaded shafts 100. Each shaft 100 is retained in its desired position, parallel with the impedance element 82, by a dust cover 102 having matching semicircular grooves therein. The shafts 100 are secured along their longitudinal axis by a radially enlarged collar 104 which is rotatably secured within an enlarged annular portion of the groove 98. Each cover 102 is retained in its position by a plurality of screws 106. An adjustable spring contact 108 engages each threaded shaft 100 and is urged against a collector plate 110 by the force of the spring action therebetween. A collector plate is located on the lower surface of each subchamber 94 and is formed with a tang 112 extending through the exterior surface thereof. Each tang 112 provides an electrical connection for the circuit of the indicating device, as does the terminal 90. A spring contact arm 114 extends from each adjustable spring cotnact 108, through the passageways 96, for engaging respective ends of the impedance element 82 on a surface opposite from the surface contacted by the wiper spring contact 74. Through this arrangement, the adjustment of the adjustable spring contacts 108 may be made to coincide with the maximum displacement of the wiper spring cotnact 74, thereby allowing for exact impedance adjustments without the necessity of a bias voltage, as explained hereinbelow.

Referring now to FIG. 4, a source of potential 116 is placed across the impedance element 82 by connecting a terminal thereof with each tang 112. Therefore, the movement of the slidable block 68 and the wiper spring contact 74, attached thereto, produces a variable potential which is applied across a pair of voltage dividing resistors 118 and 120. The resistors 118 and 120 are serially connected between the wiper spring contact 74 and a source of common or zero reference potential 122. The source of zero potential is also connected to the negative terminal of the potential source 116 and one terminal of the impedance element 82, shown here as a resistive slide-wire. The positive terminal of the potential source connects to the second terminal of resistive slide-wire 82. In the preferred embodiment the electrical connection between the potential source 116 and the resistive slide-wide 82 is made through the tang 112, collector plate 110, adjustable spring contact 108, and the spring arm 114. The output signal from the potential source, hereinafter referred to as the potential source signal, is established between the voltage dividing resistors 118 and 120, and is applied to an input terminal 124 of a differential amplifier 126. The zero potential is also applied to the amplifier case at terminal 128 and an input signal to be indicated is applied to the input terminal 130. A single output terminal 132 provides a control signal to the balancing motor 34, show nin FIG. 4 as a load resistor connected to ground. A capacitor 134 is connected between the input terminal 124 and the wiper spring contact 74 to provide damping for the indicating device. It should be noted that the capacitor 134 and the resistors, 118 and 120, combine to form a circuit for controlling the rate at which the indicator is displaced and is not a portion of the impedance element adjustment circuit.

In operation, the single pen recorder just described receives an input signal at the input terminal 130 of amplifier 126. Assuming this input signal does not equal the potential source signal, the differential amplifier will produce an output signal, proportional to the difference therebetween, for application to the balancing motor 34. The motor is then energized for driving the continuous web 12 through the gear train 36 and grooved drum 32. The driven displacement of the continuous web 12 causes the displacement of the slidable block 68, attached to the cable portion 22 of the web, and therefore, the displacement of the wiper spring contact 74 along the resistive slide-wire 82. The displacement of the wiper spring contact adjusts the potential at the input terminal 124 and balances it against the potential of the input signal. Once a balanced condition is achieved the motion of the continuous web ceases, due to an absence of an amplifier output signal. The direction of motor rotation, and therefore web motion, is determined by the amplifier circuit. That is, an input signal greater than the potential source signal causes rotation in one direction, while an input signal less than the potential source signal causes rotation in the opposite direction. An amplifier arrangement capable of producing the relationship just described may be one of several configuration well known in the art.

In the indicating device thus described, the displacement of the continuous web produces an indication of the input signal in the form of an inked line upon a chart passing transversely thereby. Therefore, it often becomes necessary to adjust the inked line to a zero reference point when the input signal is at a zero or reference potential. This adjustment, referred to as "zero" and indicated at 136 in FIG. 4, is achieved by varying the location of the adjustable spring contact 108 upon the end of the resistive slide-wire 82 connected to the zero reference potential. By rotating the shaft associated with the adjustable spring contact 108 the location of the spring arm 114 is adjusted along one end of the impedance element 82, thereby increasing or decreasing the desired resistance between the amplifier input terminal 124 and the zero potential 122 for the zero adjustment of the indicator. Due to the unique arrangement of the present invention, the zero adjustment may be achieved by matching the adjustable spring contact 108 opposite the wiper spring contact 74, when in a zero position. This arrangement greatly simplifies the circuitry normally required to produce a zero adjustment. In prior art arrangements, utilizing an external adjustment, it is necessary to establish a biasing voltage to balance the zero point of recording element. The adjustment of the full scale reading of the indicating device, referred to as "span" and indicated at 138, is achieved in a like manner. That is, the adjustment of the second adjustable spring contact 108, by rotation of the second shaft 100, adjusts the resistance between the amplifier input terminal 124 and the positive terminal of the potential source 116 for completing the span adjustment of the indicator. Again, the unique arrangement of the present invention allows the span adjustment to be achieved by matching the location of the adjustable spring contact 108 opposite the wiper spring contact 74 when the latter is in its full scale position. This arrangement eliminates the need for a biasing voltage to cancel the voltage drop across the remainder of the slide-wire 82, as in prior art devices. Thus, it may be seen that the single resistive slide-wire 82 and its associated spring contacts provide the means for adjusting the zero, span, and balance of an indicating device. These adjustments are conveniently housed within a unitary housing and their variation is achieved through a simple mechanical arrangement.

In a multi-pen recorder the added circuitry normally required is substantially reduced when the present invention is embodied therein, as shown in FIG. 5. Due to the similarities between the single pen recorder of FIG. 3 and a three pen recorder illustrated in FIG. 5, the description and numerals pertaining to FIG. 3 are equally applicable to FIG. 5. However, some important features should be noted. While the basic arrangement of the housing 38 remains substantially the same, the inner chamber 44–46 is laterally expanded with groove 72 and semicircular grooves 86 repeated for each pen of the multipen recorder to be added. Each subchamber 94 is also laterally expanded adding threaded shafts 100, adjustable spring contacts 108, and passageways 96 for each new pen of the multi-pen recorder. However, the collector 110, located within each subchamber, remains as a single expanded unit. For each pen added the set of rollers 14 and 16; the continuous web 12; and the driving motor 34, gear train 36, and grooved drum 32 are repeated. Each cable 22 of the multi-pen continuous web arrangement passes through the single housing 38 and attaches to a slidable block 68, individually associated therewith, and slidably mounted within the grooves 72 of the single housing 38. The individual slidable blocks 68 are arranged for contacting their associated resistive slide-wires 82, mounted within the semicircular grooves 86, in a manner identical to that described hereinabove. The adjustable spring contacts 108 are divided into two equal sets, by their arrangement within each subchamber 94, for contacting opposite ends of the resistive slide-wires 82 with which they are associated. Thus, the adjustment of the "zero" and "span" functions for each individual pen of the multi-pen recorder remains substantially as described hereinabove. Utilizing this arrangement, therefore, a plurality of pen adjustments and their respective resistive slide-wires may be added to a multi-pen recorder with a minimum increase in the overall volume of the adjustment means.

Figure 6:
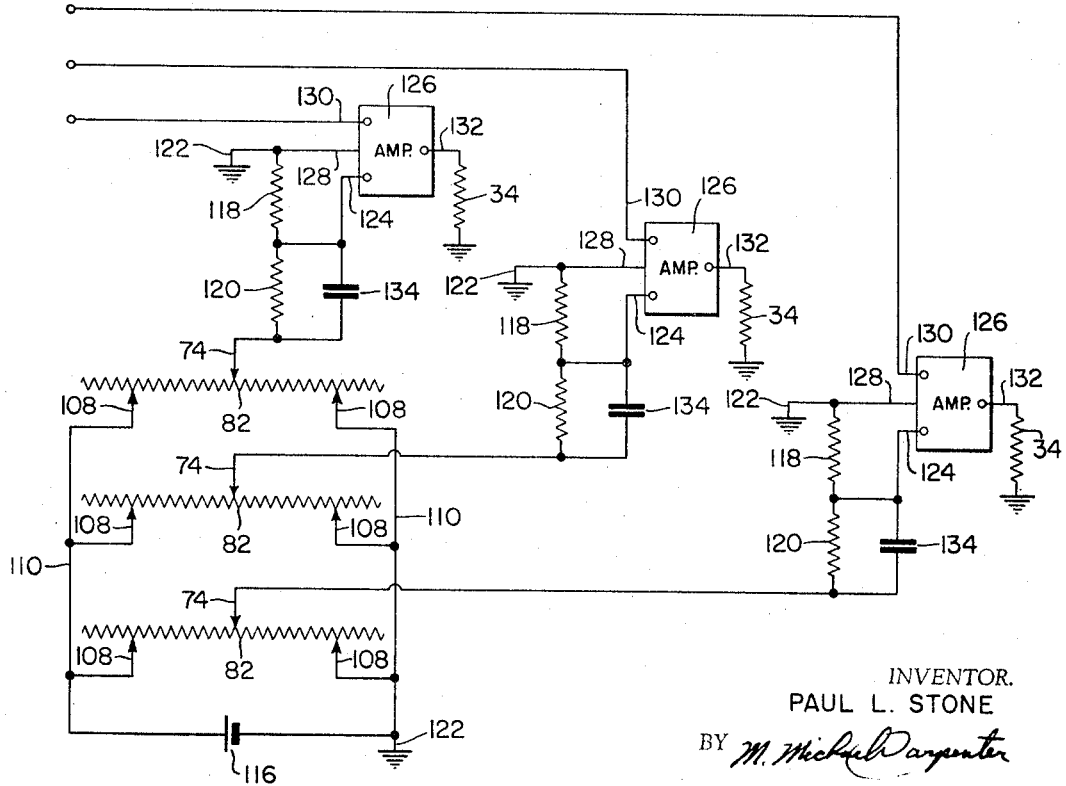
FIG. 6 is a schematic representation showing the circuitry utilized with FIG. 5.

FIG. 6 illustrates a typical circuitry which may be utilized for incorporating the adjustment means of the present invention into a three pen recorder. The numerals and description of FIG. 6 are substantially the same as that of FIG. 4. That is, each pen indicator of the three pen recorder, illustrated herein, is connected through its associated resistive slide-wire 82 to an individually associated differential amplifier 126. Each amplifier 126 receives a separate input signal through an input terminal 130 which is compared against the potential source signal received from the resistive slide-wire arrangement at terminal 124. The individual resistive slide-wires 82 are connected to a common potential source 116 through the collector 110. Due to this arrangement, it is possible to add a plurality of pen indicating devices to the single pen or three pen recorder through the addition of a single conducting wire from the housing 38, and the associated resistive slide-wire 82 therein, to a newly added amplifier 126. Through this arrangement three adjustments can be added to each newly added pen recorder by the addition of a single wire to the housing 38.

Obviously, the embodiment described hereinabove may be utilized within an indicating device having a continuous web and indicia thereon for providing a visual indication of the monitored input signal in place of the pen and chart arrangement, described hereinabove. Further, other indicating device arrangements in which the present invention may be incorporated will become obvious to those skilled in the art in light of the teachings hereinabove.

Accordingly, in keeping with the objects of the present invention, there has been provided an adjustment means for use within single or multiple indicating device having a resistive slide-wire for providing a potential which may be balanced against an unknown input potential to achieve an indication of the unknown signal. A means has further been provided for mounting the resistive slide-wire within a unitary housing incorporating means for adjusting the "zero" and "span" adjustments of the indicator through the utilization of adjustable spring contacts associated with the resistive slide-wire and mounted within the common unitary housing.

Many modifications and variations of the present invention will become obvious to those skilled in the art in light of the above teachings, and it should therefore be understood that the embodiments described hereinabove are illustrations rather than limitations. Consequently, the present invention should be limited only by the appended claims.

What is claimed is:
1. An indicating device comprising,
  rotatable supporting means,
  a continuous web passing around said rotatable supporting means and operable for providing the indication of said device,
  driving means connected to said rotatable supporting means for imparting motion to said continuous web,
  impedance means including a single impedance element arranged to control said driving means,
  housing means for supporting said single impedance element in parallel relationship with said continuous web,
  first contact means attached to said continuous web for contacting said single impedance element thus controlling said driving means during motion of said web, and
  second adjustable contact means located within said housing means for contacting said single impedance element, whereby adjustment of said second adjustable contact means varies the control effect of said single impedance element upon said driving means for adjusting said motion of said continuous web.

2. An indicating device as claimed in claim 1 wherein,
  said rotatable supporting means includes a plurality of roller means arranged for allowing said continuous web to be positioned between a pair thereof for displacement therebetween by said driving means, and
  pen means mounted on said continuous web between said pair of rollers for providing the indication of said device.

3. An indicating device as claimed in claim 2 wherein,
  said continuous web includes a tape portion and a cable portion mutually connected for forming said continuous web,
  said pair of rollers supporting said tape portion having said pen means attached therebetween,
  a third roller supporting said cable portion, and
  said cable portion passing through said housing means wherein said cable attaches to said first contact means.

4. An indicating device as claimed in claim 1 additionally comprising,
  said housing means having first and second portions each longitudinally relieved to form an inner chamber,
  said single impedance element supported within said inner chamber,
  said first portion of said housing means being relieved for receiving said second adjustable contact means in contacting arrangement against each end of said single impedance element,
  said first contact means including a block slidably arranged within said inner chamber having a spring contact thereon for contacting said single impedance element, and said block being attached to said continuous web.

5. An indicating device as claimed in claim 4 wherein,
  said single impedance element includes a resistive element and a collector element arranged in parallel within said inner chamber,
  said spring contact of said first contact means being bifurcated for simultaneously contacting said elements, and
  said second adjustable contact means including rotatable shaft means, adjustable spring contact means attached thereto, and a collector element contacting said spring contact means,
  whereby rotation of said shaft means adjusts said adjustable spring contact means along each end of said resistive element.

6. An indicating device as claimed in claim 1 comprising additionally,
  a potential source connected across said single impedance element for producing a potential source signal,
  said impedance means including amplifying means for receiving an input signal to be indicated and said potential source signal to be compared thereto for producing an output signal,
  means for applying said output signal from said amplifying means to said driving means,
  whereby said output signal from said amplifier energizes said driving means for moving said first contact means along said single impedance element thereby balancing said potential source signal against said input signal.

7. An indicating device as claimed in claim 6 wherein,
  said second adjustable contact means are arranged at each end of said single impedance element and adjustment thereof along said single impedance element preadjusts said potential source signal for achieving a zero adjustment and a full scale adjustment of said indicating device.

8. An indicating device as claimed in claim 1 additionally comprising,
  a plurality of said continuous webs supported upon said rotatable supporting means,
  a plurality of said driving means and said single impedance elements individually associated with said plurality of continuous webs,
  said housing including a single housing through which said plurality of continuous webs pass in parallel relationship with said individually associated impedance elements,
  a plurality of said first contact means individually attached to said plurality of continuous webs for slidably contacting said associated impedance elements, and
  a plurality of said second adjustable contact means individually arranged in contacting relationship with each of said impedance elements.

9. An indicating device as claimed in claim 8 wherein,
  said plurality of second adjustable contact means include a plurality of adjustable spring contacts individually contacting each end of said plurality of impedance elements thereby forming equally divided sets at each end thereof, and
  collector means commonly connecting said sets of said plurality of adjustable spring contacts.

10. An indicating device used within a self-balancing potentiometer of the continuous web type having a single impedance element and an impedance element contact attached to said continuous web for displacement across said single impedance element in response to an input signal to be indicated thereby wherein the improvement comprises,
  a pair of adjustable contact means arranged for contacting opposite ends of said single impedance element and adjustable for coinciding with the points of maximum and minimum displacements of said impedance element contact across said single impedance element thereby allowing for adjustment of said indicating device by matching said pair of adjustable contact means with said maximum and minimum displacements of said impedance element contact across said single impedance element.

References Cited

UNITED STATES PATENTS

| | | | |
|---|---|---|---|
| 2,150,006 | 3/1939 | Parker et al. | 324—99 XR |
| 2,423,480 | 7/1947 | Caldwell | 346—32 |
| 2,442,329 | 5/1948 | Harrison et al. | 324—100 XR |
| 2,606,092 | 8/1952 | Rich | 346—29 XR |
| 2,679,630 | 5/1954 | Felch et al. | 324—99 |
| 2,787,511 | 4/1957 | Ehret | 346—29 |
| 2,968,805 | 1/1961 | Sikorra | 324—98 XR |
| 2,985,728 | 5/1961 | Macune. | |
| 3,095,254 | 6/1963 | Chope | 346—32 |
| 3,178,715 | 4/1965 | Demko | 346—32 XR |
| 3,302,112 | 1/1967 | Hyer | 324—99 |

RUDOLPH V. ROLINEC, Primary Examiner.

G. R. STRECKLER, Assistant Examiner.

U.S. Cl. X.R.

346—32